May 2, 1950 K. W. LYONS 2,506,092
SIGNALING FLAG FOR ICE FISHING APPARATUS
Filed Sept. 16, 1947 2 Sheets-Sheet 1
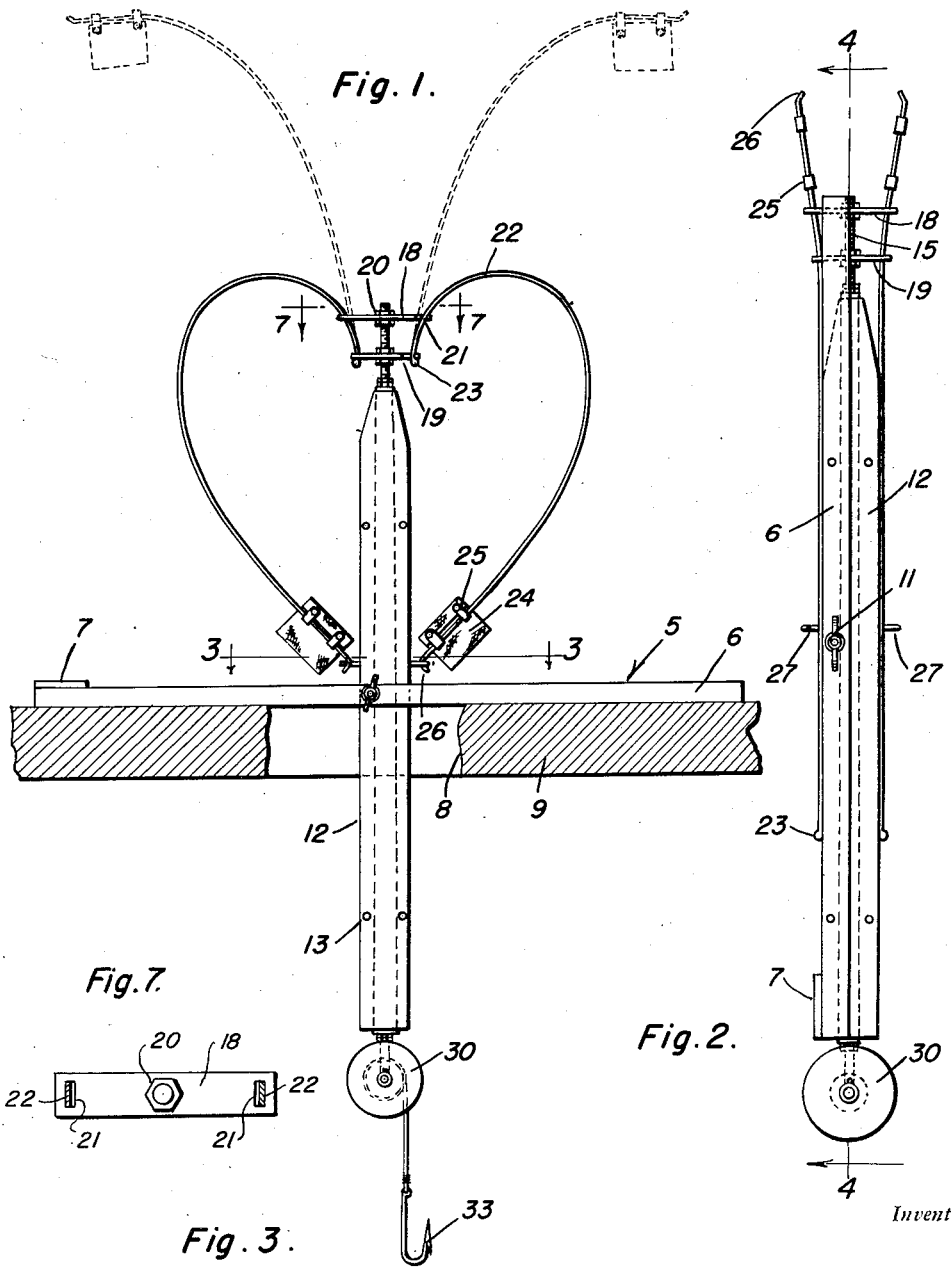
Inventor
Kenneth W. Lyons
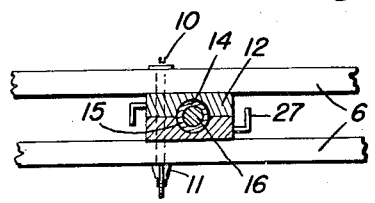
Attorneys

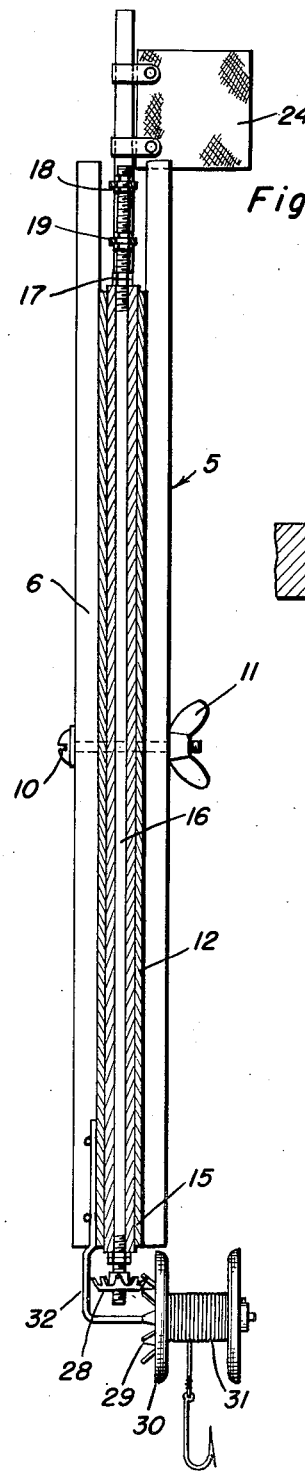
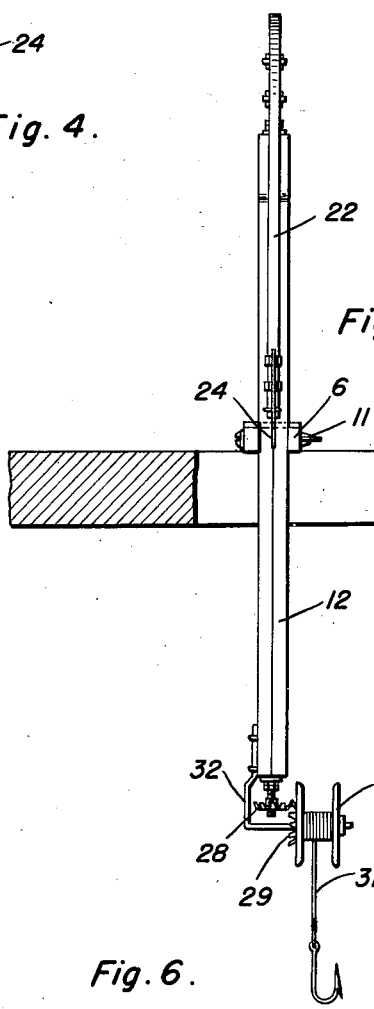
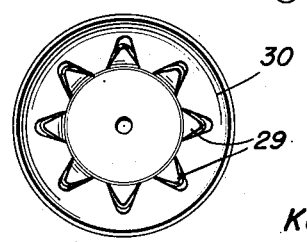

Patented May 2, 1950

2,506,092

UNITED STATES PATENT OFFICE 2,506,092

SIGNALING FLAG FOR ICE FISHING APPARATUS

Kenneth W. Lyons, Meriden, Conn.

Application September 16, 1947, Serial No. 774,334

1 Claim. (Cl. 43—17)

The present invention relates to new and useful improvements in apparatus for use in ice fishing and more particularly to a signaling flag to warn the fisherman when a fish has been hooked.

An important object of the present invention is to provide means for holding a signaling flag of this character in a set position and released by the action of a fish after becoming hooked and also embodying means whereby the flag is agitated after becoming released to attract the attention of the fisherman.

A further object of the invention is to provide an apparatus of this character which includes a vertical shaft to which the signaling flag is attached together with means for supporting the shaft in a vertical position in a hole in the ice and a reel attached to the lower end of the shaft for a fishing line and operable upon the paying out of the line when a fish is hooked to rotate the shaft to release the flag for a raising movement and for a horizontal swinging movement by the rotation of the shaft to attract the attention of the fisherman.

A still further object is to provide a foldable apparatus of this character which may be conveniently stored in a compact form for transportation or storing purposes.

A still further object is to provide an apparatus of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing the signaling apparatus supported in a position in a hole in the ice and with the signaling flag set;

Figure 2 is a side elevational view showing the device in folded position;

Figure 3 is a transverse sectional view taken on the line 3—3 of Figure 1;

Figure 4 is a vertical sectional view taken on the line 4—4 of Figure 2;

Figure 5 is a side elevational view taken at right angles to Figure 1;

Figure 6 is an end elevational view of the reel showing the gear teeth struck therefrom; and Figure 7 is an enlarged sectional view taken on a line 7—7 of Figure 1.

Referring now to the drawings in detail wherein for the purpose of illustration I have disclosed a preferred embodiment of the invention the numeral 5 designates a base generally which is composed of a pair of spaced parallel rails 6 connected to each other at one end by a cross member 7, the rails being of sufficient length to bridge a fishing hole 8 cut in ice 9.

A bolt 10 with wing nut 11 threaded on one end extends transversely of the rails 6 at the intermediate portion thereof, the bolt also extending through an elongated housing 12 formed of a pair of wooden bars secured to each other in side by side relation by suitable fasteners 13 and positioned between the rails 6, the housing being swingable on the bolt 10 into a folded position longitudinally of the rails 6 or into an open upright position as shown in Figure 1, the housing being held in its folded or open position by the wing nut 11.

The opposed faces of the bars 12 are formed with longitudinal grooves 14 for receiving a tube 15 forming a housing for a shaft 16 rotatable in the housing.

Each end of the shaft 16 is threaded to receive nuts 17 for holding the shaft against endwise movement in the housing and upper and lower transversely extending plates 18 and 19 are secured in vertically adjusted position on the upper end of the shaft 16 and in spaced relation one above the other by nuts 20. The upper plate 18 is of a length greater than the lower plate 19 and each of the plates, adjacent each end thereof is formed with an opening 21 for slidably receiving spring arms 22 in the ends of the plates. The inner end of each spring arm is formed with a head 23 to prevent withdrawal of the arm through the opening 21 and to the outer end of each arm is secured a felt flag 24 by clips or the like 25.

The outer end of each spring arm is bent in the form of a hook 26 engaged behind an angular stop 27 projecting outwardly from an adjacent edge of the housing 12. The stops 27 for the respective arms 22 open in opposite directions whereby to automatically free the hooks 26 therefrom by a rotation of the shaft 16 in a predetermined direction.

A gear 28 is secured on the lower end of the shaft 16 engaging a gear 29 having its teeth struck from one of the flanges of a reel 30 on which a fishing line 31 is wound. The reel or spool 30 is journaled on an angular bracket 32 secured to the lower end of the housing 12.

In the operation of the device the base 5 is placed in a position for bridging a fishing hole 8 in the ice 9 and with the housing 12 supported in an upright position with the lower end thereof extending downwardly through the hole.

The spring arms 22 are bent downwardly to engage the hooks 26 with the stops 27 to thus hold the flag 24 in a lowered position.

When a fish is caught on the hook 33 at the end of the fishing line 31 the spool or reel 30 is rotated by the pulling action of the fish, thereby rotating the shaft 16 through the gears 28 and 29 and releasing the hooks 26 from the stops 27 whereupon the arms 22 will swing upwardly to raise the flag 24. The action of the fish will continue to rotate the shaft 11 thereby swinging the flag 24 horizontally to attract attention of the fisherman thereto.

When the device is not in use or is being transported the housing 12 and base 5 are swung substantially in parallelism with each other and the arms 22 moved inwardly through the openings 22 against the opposite side edges of the housing 12 to thus hold the device in a substantially compact form as shown in Figure 2 of the drawings.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In a fishing apparatus including a shaft, means rotatably supporting the shaft in a vertical position, upper and lower horizontal plates at the upper end of the shaft, said plates having openings adjacent their ends and with the openings of the upper plate positioned outwardly with respect to the openings of the lower plate, and resilient signal flags slidably positioned in said openings for collapsing against the sides of the shaft supporting means, said openings holding the flags in an outwardly inclined position to brace each flag at two points when flexed downwardly in a set position.

KENNETH W. LYONS.

REFERENCES CITED

The following references are of record in the file of this patent:

UNITED STATES PATENTS

| Number | Name | Date |
|---|---|---|
| 2,198,286 | Krivutza | Apr. 23, 1940 |
| 2,448,346 | Baugh et al. | Aug. 31, 1948 |
| 2,451,693 | Richards | Oct. 19, 1948 |